United States Patent
Iwabuchi et al.

(10) Patent No.: US 12,395,872 B2
(45) Date of Patent: Aug. 19, 2025

(54) RADIO COMMUNICATION METHOD, RADIO COMMUNICATION SYSTEM, RADIO BASE STATION, AND REFLECTOR

(71) Applicant: NIPPON TELEGRAPH AND TELEPHONE CORPORATION, Tokyo (JP)

(72) Inventors: Masashi Iwabuchi, Musashino (JP); Tomoaki Ogawa, Musashino (JP); Tomoki Murakami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 477 days.

(21) Appl. No.: 17/922,080

(22) PCT Filed: May 27, 2020

(86) PCT No.: PCT/JP2020/020991
§ 371 (c)(1),
(2) Date: Oct. 28, 2022

(87) PCT Pub. No.: WO2021/240699
PCT Pub. Date: Dec. 2, 2021

(65) Prior Publication Data
US 2023/0171624 A1    Jun. 1, 2023

(51) Int. Cl.
*H04W 24/08* (2009.01)
*H04W 16/26* (2009.01)

(52) U.S. Cl.
CPC ........... *H04W 24/08* (2013.01); *H04W 16/26* (2013.01)

(58) Field of Classification Search
CPC ..... H04W 24/08; H04W 16/26; H04B 17/309
See application file for complete search history.

(56) References Cited

U.S. PATENT DOCUMENTS

2023/0327831 A1* 10/2023 Xu ................... H04W 24/08
370/329

OTHER PUBLICATIONS

C. Liaskos et al., "Using any Surface to Realize a New Paradigm for Wireless Communications", Communications of the ACM, vol. 61, No. 11, Jun. 2018.

(Continued)

*Primary Examiner* — Sulaiman Nooristany
(74) *Attorney, Agent, or Firm* — Harness, Dickey & Pierce, P.L.C.

(57) ABSTRACT

Communication is performed between a radio base station and a radio terminal via a reflector. The radio base station transmits a measurement signal including a beam ID of a transmission beam for measuring communication quality between the radio base station and the radio terminal. The reflector reflects the measurement signal incident on the reflector in multiple reflection directions to generate multiple reflected measurement signals. Moreover, the reflector modulates the incident measurement signal during reflection to add information about a reflection direction ID being different for each of the multiple reflection directions to each of the multiple reflected measurement signals. The radio terminal demodulates a reflected measurement signal received from the reflector to acquire the reflection direction ID and the beam ID. The radio terminal then evaluates the communication quality for each combination of the beam ID and the reflection direction ID based on reception state of the received reflected measurement signal.

6 Claims, 10 Drawing Sheets

(56) References Cited

OTHER PUBLICATIONS

E. Basar et al., "Wireless Communications Through Reconfigurable Intelligent Surfaces", IEEE Access, vol. 7, Aug. 2019.

N. V. Huynh et al., "Ambient Backscatter Communications: A Contemporary Survey", IEEE Communications Surveys and Tutorials, vol. 20, Issue 4, Dec. 2017.

* cited by examiner

Fig. 8

<REFLECTION GROUP INFORMATION GRP>

| GROUP NUMBER | REFLECTION UNIT NUMBER | REFLECTION DIRECTION | REFLECTION DIRECTION ID |
|---|---|---|---|
| 1 | 1, 2, 3, 4 | +10 deg. | #AR1 |
| 2 | 5, 6, 7, 8 | +45 deg. | #AR2 |
| ⋮ | ⋮ | ⋮ | ⋮ |
| N | ···, (m-1), m |  | #ARN |

Fig. 10

<COMMUNICATION QUALITY INFORMATION QLC>

| BEAM ID | REFLECTION DIRECTION ID | COMMUNICATION QUALITY (SINR) |
|---|---|---|
| #B1 | #AR1 | 10dB |
| #B1 | #AR2 | 20dB |
| #B2 | #AR3 | 5dB |
| #B2 | #AR4 | 7dB |
| #B4 | #BR1 | 3dB |
| #B4 | #BR1 | 10dB |

RADIO COMMUNICATION METHOD, RADIO COMMUNICATION SYSTEM, RADIO BASE STATION, AND REFLECTOR

CROSS-REFERENCE TO RELATED APPLICATIONS

This application is a 371 U.S. National Phase of International Application No. PCT/JP2020/020991, filed on May 27, 2020. The entire disclosure of the above application is incorporated herein by reference.

TECHNICAL FIELD

The present disclosure relates to a technique for performing communication between a radio base station and a radio terminal via a reflector.

BACKGROUND ART

Attention is paid to utilization of high-frequency bands capable of ensuring wide bandwidths in order to achieve a radio access having a high speed and capacity. For example, a 5G mobile communication system utilizes a 28 GHz band to achieve communication having a high speed and capacity. In another example, a wireless LAN standard IEEE 802.11ad (millimeter wave wireless LAN system) utilizes a 60 GHz band to achieve communication having a high speed and capacity.

Radio waves in high-frequency bands are characterized in being easily attenuated and being difficult to diffract compared to radio waves in low-frequency bands. As a result, problems in the high-frequency bands include short transmission distances due to radio wave attenuation, and deterioration of reception quality due to obstacles and the like.

Beam forming using multi-element antennas is effective in compensating for radio wave attenuation. Beam forming gains can compensate for the radio wave attenuation and extend the transmission distance. Note that in the case of beam forming, a reception station mainly receives radio waves transmitted concentratively toward a certain direction from a transmission station. That is, the reception station mainly receives radio waves in one transmission path having high power. Thus, the number of spatial multiplexes is limited to one (or two by polarization multiplexing), and it is also difficult to achieve an effect of spatial diversity.

On the other hand, it is conceivable to provide a large number of transmission points in order to suppress deterioration of reception quality due to obstacles and the like. For example, when a large number of transmission antennas are installed at different locations, it is possible to reduce an area in an out-of-sight environment and improve the reception quality. This can solve the above-mentioned problems in the beam forming. However, if a large number of transmission antennas are installed at different locations, a network cost and installation locations increase.

It is also effective to utilize a reflection apparatus (a reflection plate or a reflector) having a lower cost and smaller installation size in order to provide a large number of transmission points. In particular, in recent years, a metasurface reflector and the like capable of dynamically controlling reflection characteristic such as the reflection direction have also been developed (see NPL 1 and NPL 2). When such a reflection apparatus is utilized to form a plurality of transmission paths for one reception station, it is possible to improve the communication performance such as communication quality and spatial multiplicity.

NPL 3 discloses a technology called "backscatter communication." A backscatter transmitter receives an RF signal present in the surrounding environment, instead of generating a carrier wave by itself, and modulates and reflects the received RF signal to transmit data. More specifically, in reflecting the received RF signal, the backscatter transmitter modulates the received RF signal by switching a load impedance of an antenna at high speed. This makes it possible to reflect the received RF signal while adding desired information to the received RF signal. A transmission rate is different between the original RF signal and the information added in the backscatter transmitter. A backscatter receiver is able to extract the information added in the backscatter transmitter, based on the difference in the transmission rate. For example, the backscatter receiver smooths the received RF signal, calculates a threshold value, and then, compares the smoothed signal with the threshold value to extract the desired information.

CITATION LIST

Non-Patent Literature

NPL 1: C. Liaskos, A. Tsioliaridou, A. Pitsillides, S. Ioannidis, and I. Akyildiz, "Using any Surface to Realize a New Paradigm for Wireless Communications", Communications of the ACM, Vol. 61, No. 11, June 2018.

NPL 2: E. Basar, M. D. Renzo, J. D. Rosny, M. Debbah, M-S Alouini, and R. Zhang, "Wireless Communications Through Reconfigurable Intelligent Surfaces," IEEE Access, Vol. 7, August 2019.

NPL 3: N. V. Huynh, D. T. Hoang, X. Lu, D. Niyato, P. Wang, and D. I. Kim, "Ambient Backscatter Communications: A Contemporary Survey," IEEE Communications Surveys and Tutorials, Vol. 20, Issue 4, December 2017.

SUMMARY OF THE INVENTION

Technical Problem

A case where a reflector is utilized to perform communication between a radio base station and a radio terminal is considered. The radio base station performs beam forming and transmits a signal by a transmission beam. The reflector reflects the signal transmitted from the radio base station. The radio terminal receives the signal reflected by the reflector.

Here, it is assumed that the number of candidate transmission directions of the transmission beam in the radio base station is X (X is an integer equal to or greater than 1). It is also assumed that the number of reflectors is Y (Y is an integer equal to or greater than 1). It is also assumed that the number of candidate reflection directions in each reflector is Z (Z is an integer equal to or greater than 2). In this case, a total number of candidate transmission paths from the radio base station to the radio terminal via the reflector is represented by X×Y×Z (plural number).

An appropriate one is selected from among the plurality of candidate transmission paths and used for the radio communication. For example, one having the highest communication quality among the plurality of candidate transmission paths is selected as the appropriate transmission path. Therefore, it is necessary to evaluate (acquire) the communication qualities of all the candidate transmission paths in order to select the appropriate one from among the plurality of candidate transmission paths.

A method for evaluating the communication quality of one certain candidate transmission path is as follows. The radio base station presets a reflection direction in the reflector to one direction corresponding to the candidate transmission path. Then, the radio base station transmits a measurement signal for measuring the communication quality by a transmission beam corresponding to the candidate transmission path. The reflector reflects the measurement signal incident on the reflector in the preset one reflection direction. The radio terminal evaluates the communication quality of the candidate transmission path, based on a reception state of the reflected measurement signal received from the reflector.

It is possible to evaluate the communication qualities of all the candidate transmission paths by repeating the above-described series of processing for all of the plurality of candidate transmission paths, that is, by repeating X×Y×Z times. Then, comparing the communication qualities of all the candidate transmission paths makes it possible to select the appropriate transmission path.

However, it takes a long time to repeat the above-described series of processing for the communication quality evaluation X×Y×Z times. An increase in the time required for the communication quality evaluation leads to an increase in time required for determining the appropriate transmission path, and moreover, leads to a delay in initiation of the communication between the radio base station and the radio terminal. In a situation where the radio terminal moves, these facts lead to degradation of communication characteristics.

An object of the present disclosure is to provide a technique capable of reducing a time required for evaluating a quality of communication between a radio base station and a radio terminal via a reflector.

Means for Solving the Problem

A first aspect is directed to a radio communication method of performing communication between a radio base station and a radio terminal via a reflector.
The radio base station is configured to form a transmission beam and transmit a signal by the transmission beam.
The reflector is configured to reflect the signal transmitted from the radio base station.
The radio terminal is configured to receive the signal reflected by the reflector.
The radio communication method includes:
 (A) measurement signal transmission processing that transmits a measurement signal including a beam ID of the transmission beam from the radio base station, the measurement signal being for measuring a quality of communication between the radio base station and the radio terminal;
 (B) measurement signal reflection processing that reflects the measurement signal incident on the reflector in a plurality of reflection directions to generate a plurality of reflected measurement signals, and modulates the incident measurement signal during reflection to add information about a reflection direction ID to each of the plurality of reflected measurement signals, the reflection direction ID being different for each of the plurality of reflection directions; and
 (C) communication quality evaluation processing that, by the radio terminal, demodulates a reflected measurement signal received from the reflector to acquire the reflection direction ID and the beam ID, and evaluates the quality of communication for each combination of the beam ID and the reflection direction ID based on a reception state of the received reflected measurement signal.

A second aspect is directed to a radio communication system.
The radio communication system includes:
 a radio base station configured to form a transmission beam and transmit a signal by the transmission beam;
 a reflector configured to reflect the signal transmitted from the radio base station; and
 a radio terminal configured to receive the signal reflected by the reflector.
The radio base station is configured to perform measurement signal transmission processing that transmits a measurement signal including a beam ID of the transmission beam, the measurement signal being for measuring a quality of communication between the radio base station and the radio terminal.
The reflector is configured to perform measurement signal reflection processing that reflects the measurement signal incident on the reflector in a plurality of reflection directions to generate a plurality of reflected measurement signals, and modulates the incident measurement signal during reflection to add information about a reflection direction ID to each of the plurality of reflected measurement signals, the reflection direction ID being different for each of the plurality of reflection directions.
The radio terminal is configured to perform communication quality evaluation processing that demodulates a reflected measurement signal received from the reflector to acquire the reflection direction ID and the beam ID, and evaluates the quality of communication for each combination of the beam ID and the reflection direction ID based on a reception state of the received reflected measurement signal.

A third aspect is directed to a radio base station that communicates with a radio terminal.
The radio base station is configured to form a transmission beam and transmit a signal by the transmission beam.
A reflector is configured to reflect the signal transmitted from the radio base station.
The radio terminal is configured to receive the signal reflected by the reflector.
The radio base station is configured to perform measurement signal transmission processing that transmits a measurement signal including a beam ID of the transmission beam, the measurement signal being for measuring a quality of communication between the radio base station and the radio terminal.
The reflector is configured to perform measurement signal reflection processing that reflects the measurement signal incident on the reflector in a plurality of reflection directions to generate a plurality of reflected measurement signals, and modulates the incident measurement signal during reflection to add information about a reflection direction ID to each of the plurality of reflected measurement signals, the reflection direction ID being different for each of the plurality of reflection directions.
The radio terminal is configured to perform communication quality evaluation processing that demodulates a reflected measurement signal received from the reflector to acquire the reflection direction ID and the beam ID, and evaluates the quality of communication for each combination of the beam ID and the reflection direction ID based on a reception state of the received reflected measurement signal.

In the measurement signal transmission processing, the radio base station transmits the measurement signal including the beam ID and not including the reflection direction ID.

A fourth aspect is directed to a reflector that reflects a signal transmitted from a radio base station.

The radio base station is configured to form a transmission beam and transmit the signal by the transmission beam.

The radio terminal is configured to receive the signal reflected by the reflector.

The radio base station is configured to perform measurement signal transmission processing that transmits a measurement signal including a beam ID of the transmission beam, the measurement signal being for measuring a quality of communication between the radio base station and the radio terminal.

The reflector is configured to perform measurement signal reflection processing that reflects the measurement signal incident on the reflector in a plurality of reflection directions to generate a plurality of reflected measurement signals, and modulates the incident measurement signal during reflection to add information about a reflection direction ID to each of the plurality of reflected measurement signals, the reflection direction ID being different for each of the plurality of reflection directions.

The radio terminal is configured to perform communication quality evaluation processing that demodulates a reflected measurement signal received from the reflector to acquire the reflection direction ID and the beam ID, and evaluates the quality of communication for each combination of the beam ID and the reflection direction ID based on a reception state of the received reflected measurement signal.

Effects of the Invention

According to the present disclosure, the measurement signal including the beam ID of the transmission beam is transmitted from the radio base station. The measurement signal incident on the reflector is reflected in the plurality of reflection directions. During the reflection, the information about the reflection direction ID being different for each of the plurality of reflection directions is added to each of the plurality of reflected measurement signals. In the radio terminal, the communication quality is evaluated for each combination of the beam ID and the reflection direction ID based on the received reflected measurement signal. The combination of the beam ID and the reflection direction ID corresponds to the candidate transmission path from the radio base station to the radio terminal via the reflector. Since the plurality of reflected measurement signals are generated from a single measurement signal in the reflector, transmitting the single measurement signal makes it possible to collectively evaluate the communication qualities of the plurality of candidate transmission paths. Consequently, the time required for evaluating the communication qualities is reduced. Furthermore, since the number of times of the transmission of the measurement signal is reduced, usage of radio resources is reduced and a frequency usage efficiency is improved.

BRIEF DESCRIPTION OF DRAWINGS

FIG. 8 is a conceptual diagram showing an example of reflection group information according to an embodiment of the present disclosure.

FIG. 10 is a conceptual diagram showing an example of communication quality information according to an embodiment of the present disclosure.

DESCRIPTION OF EMBODIMENTS

Embodiments of the present disclosure will be described with reference to the accompanying drawings.

1. Basic Configuration of Radio Communication System

Figure 1:
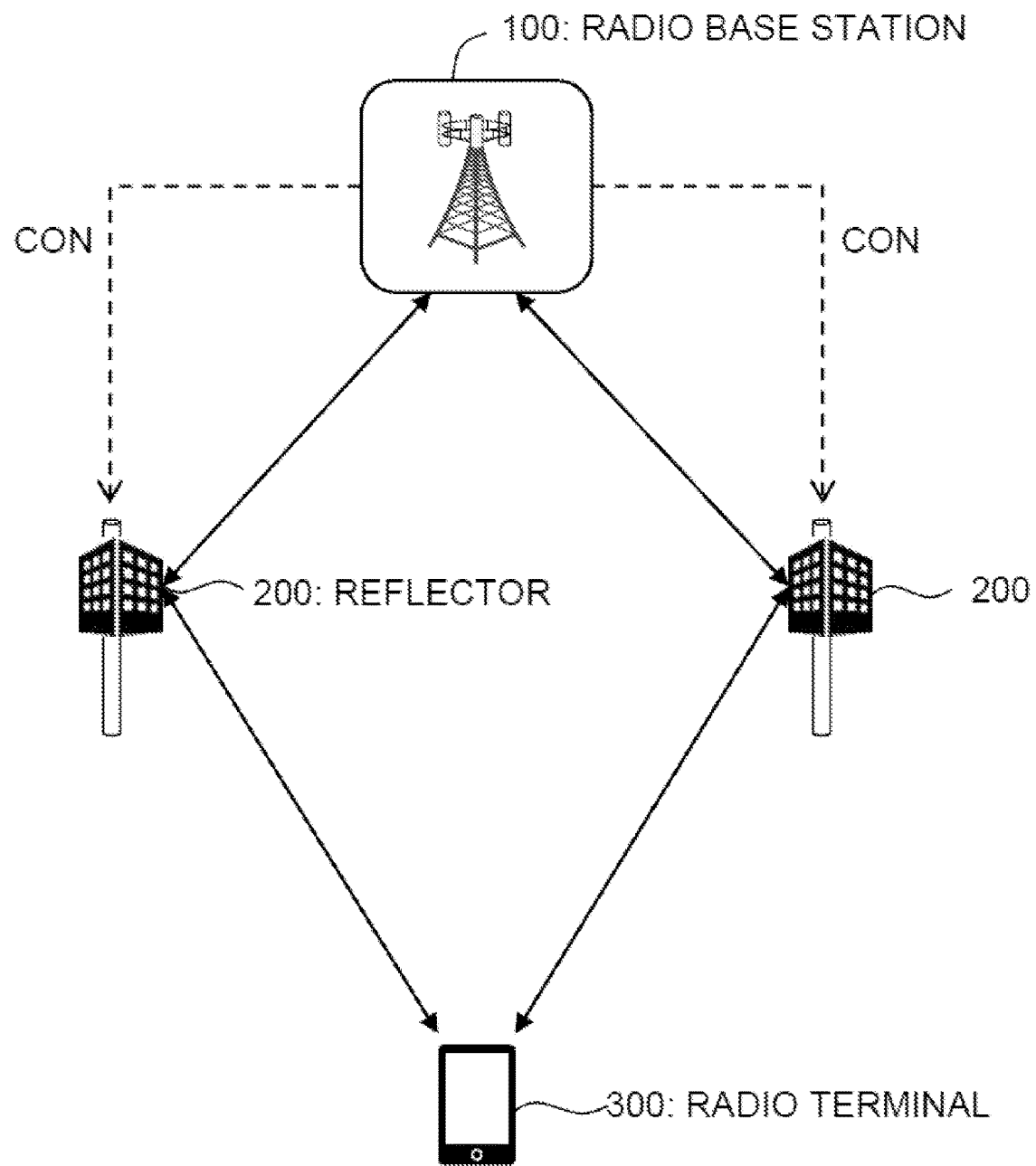
FIG. 1 is a schematic diagram showing an example of a basic configuration of a radio communication system according to an embodiment of the present disclosure.

FIG. 1 is a schematic diagram showing an example of a basic configuration of a radio communication system 10 according to an embodiment of the present disclosure. The radio communication system 10 includes a radio base station 100, a reflector 200, and a radio terminal 300. Radio communication is performed between the radio base station 100 and the radio terminal 300. For example, the radio communication is performed in a high-frequency band such as a millimeter wave band. Beam forming using multi-element antennas is effective to compensate for radio wave attenuation in the high-frequency bands.

The reflector 200 (a reflection plate or a reflector) is configured to reflect an incident signal. In addition, the reflector 200 is capable of dynamically controlling a reflection characteristic including a reflection direction of the signal. For example, the reflector 200 includes a metasurface reflector utilizing a metasurface.

The reflection characteristic of the reflector 200 can be controlled by the radio base station 100. Specifically, the radio base station 100 transmits, to the reflector 200, reflection control information CON for controlling the reflection characteristic of the reflector 200. For example, the reflection control information CON specifies a reflection direction of the signal and the number of reflection directions in the reflector 200. The reflector 200 sets at least one reflection direction in accordance with the reflection control information CON.

According to the present embodiment, the radio communication between the radio base station 100 and the radio terminal 300 is performed by utilizing the reflector 200. For example, the radio base station 100 forms a transmission beam and transmits a signal by the transmission beam. The reflector 200 reflects the signal transmitted from the radio base station 100 in the set reflection direction. The radio terminal 300 receives the signal reflected by the reflector 200. In this manner, utilizing the reflector 200 enables forming a transmission path from the radio base station 100 to the radio terminal 300 via the reflector 200. It should be noted that the transmission path used herein means a transmission path in which the radio terminal 300 can receive the signal transmitted from the radio base station 100 with a certain reception power or greater.

When a plurality of reflectors 200 are installed, a plurality of transmission paths may be formed via the plurality of reflectors 200, respectively. Not only the transmission path via the reflector 200 but also a direct transmission path not passing through any reflector 200 may be present. In either case, the plurality of transmission paths can be formed with respect to a single radio terminal 300 by utilizing the reflector 200. Forming the plurality of transmission paths makes it possible to improve a communication performance such as a communication quality and spatial multiplicity.

With a movement of the radio terminal 300, ab optimal transmission path via the reflector 200 may also change. Therefore, the radio base station 100 may dynamically change the reflection direction in the reflector 200 according to the movement of the radio terminal 300.

2. Communication Quality Evaluation 2-1. Overview

There may be a plurality of candidate transmission paths from the radio base station 100 to the radio terminal 300 via the reflector 200. An appropriate transmission path is selected from among the plurality of candidate transmission paths and used for the radio communication. For example, one having the highest communication quality among the plurality of candidate transmission paths is selected as the appropriate transmission path. Therefore, it is necessary to evaluate (acquire) the communication qualities of all the candidate transmission paths in order to select the appropriate one from among the plurality of candidate transmission paths.

Figure 2:
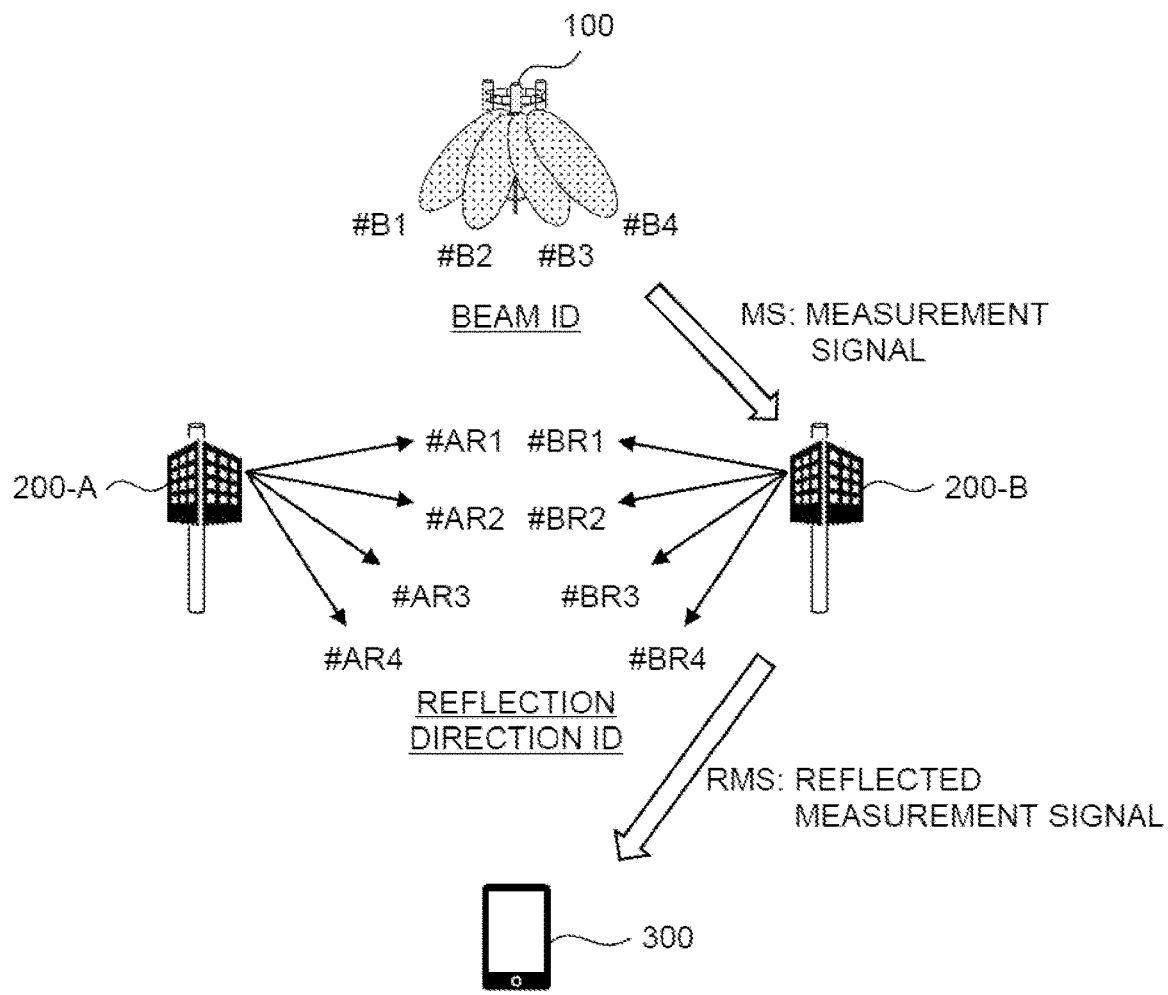
FIG. 2 is a conceptual diagram for explaining a method of evaluating a quality of communication between a radio base station and a radio terminal according to an embodiment of the present disclosure.

FIG. 2 is a conceptual diagram for explaining a method of evaluating the communication quality according to the present embodiment. A "measurement signal MS" for measuring the communication quality is utilized for the communication quality evaluation. The measurement signal MS may be a reference signal. The radio base station 100 forms a transmission beam and transmits the measurement signal MS by the transmission beam. The reflector 200 reflects the measurement signal MS incident on the reflector 200. For convenience, the measurement signal MS reflected by the reflector 200 is hereinafter referred to as a "reflected measurement signal RMS." The radio terminal 300 receives the reflected measurement signal RMS from the reflector 200. Then, the radio terminal 300 evaluates the communication quality of each candidate transmission path, based on a reception state of the received reflected measurement signal RMS.

There are a plurality of candidate transmission paths. More specifically, it is assumed that the number of candidate transmission directions of the transmission beam in the radio base station 100 is X (X is an integer equal to or greater than 1). It is also assumed that the number of reflectors 200 is Y (Y is an integer equal to or greater than 1). It is also assumed that the number of candidate reflection directions in each reflector 200 is Z (Z is an integer equal to or greater than 2). In this case, a total number of candidate transmission paths from the radio base station 100 to the radio terminal 300 via the reflector 200 is represented by X×Y×Z (plural number). In the example shown in FIG. 2, X is 4, Y is 2, and Z is 4, and the total number of candidate transmission paths is 32. It should be noted that a case where the number (Z) of candidate reflection directions in each reflector 200 is the same is considered here for simplicity, but the number (Z) may be different for each reflector 200.

A beam ID is identification information for identifying the transmission direction of the transmission beam. The beam ID is different for each transmission direction (candidate transmission direction). In the example shown in FIG. 2, beam IDs #B1 to #B4 are assigned to four transmission directions (candidate transmission directions), respectively.

A reflection direction ID is identification information for identifying the reflection direction in the reflector 200. The reflection direction ID is different for each reflection direction (candidate reflection direction). The reflection direction ID may include both identification information for identifying the reflector 200 and identification information for identifying the reflection direction in the reflector 200. In the example shown in FIG. 2, reflection direction IDs #AR1 to #AR4 are assigned to four reflection directions (candidate reflection directions) in a reflector 200-A, respectively. Similarly, reflection direction IDs #BR1 to #BR4 are assigned to four reflection directions (candidate reflection directions) in a reflector 200-B, respectively.

One transmission path (candidate transmission path) corresponds to a combination of one beam ID and one reflection direction ID. Determining the appropriate transmission path corresponds to determining an appropriate combination of the beam ID and the reflection direction ID. In order to determine the appropriate combination of the beam ID and the reflection direction ID, it is necessary to evaluate the communication quality for each combination of the beam ID and the reflection direction ID.

The total number of combinations of the beam ID and the reflection direction ID, that is, the total number of candidate transmission paths is X×Y×Z (plural number) as described above. How to efficiently evaluate the communication qualities of all the candidate transmission paths by using the above-mentioned measurement signal MS will be described below as well as a comparative example.

Figure 3:
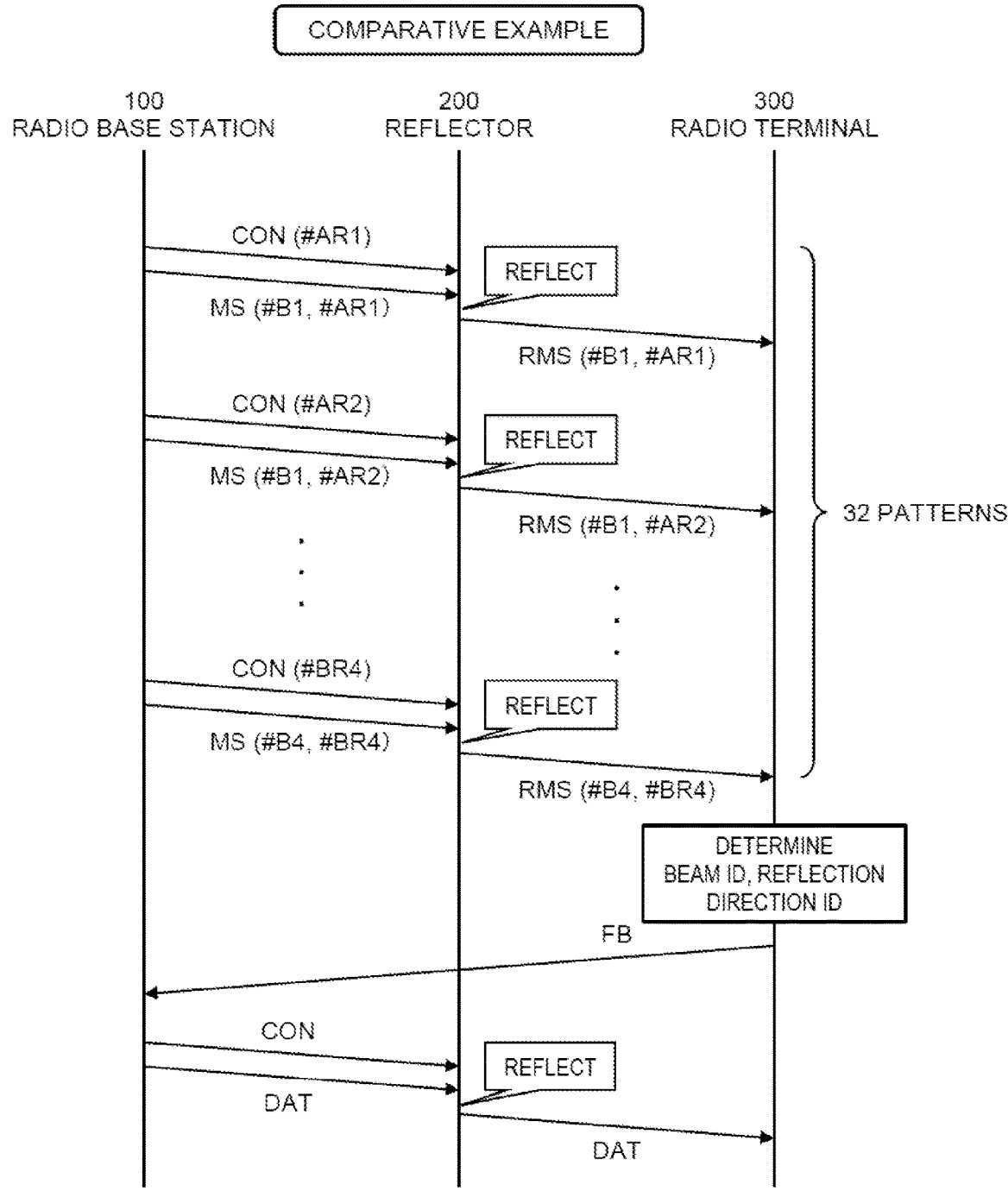
FIG. 3 is a sequence diagram showing processing related to communication quality evaluation according to a comparative example.

2-2. Processing Related to Communication Quality Evaluation According to Comparative Example First, a comparative example will be described. FIG. 3 is a sequence diagram showing processing related to the communication quality evaluation according to the comparative example.

First, the radio base station 100 selects one candidate transmission path (that is, one candidate transmission direction, one reflector 200, and one candidate reflection direction) as a target of the communication quality evaluation. In other words, the radio base station 100 selects one combination of the beam ID and the reflection direction ID. For example, the radio base station 100 selects the beam ID=#B1 and the reflection direction ID=#AR1.

Subsequently, the radio base station 100 presets the reflection direction in the selected reflector 200. Specifically, the radio base station 100 transmits the reflection control information CON specifying the reflection direction ID (#AR1) to the selected reflector 200-A. The reflector 200-A sets the reflection direction corresponding to the reflection direction ID (#AR1) in accordance with the reflection control information CON.

Subsequently, the radio base station 100 transmits the measurement signal MS by the transmission beam corresponding to the beam ID (#B1). The measurement signal MS includes information on both the beam ID (#B1) and the reflection direction ID (#AR1). When the measurement signal MS is incident on the reflector 200-A, the reflector 200-A reflects the incident measurement signal MS in the one preset reflection direction. Upon receiving the reflected measurement signal RMS from the reflector 200-A, the radio terminal 300 acquires information about the beam ID (#B1) and the reflection direction ID (#AR1) from the received reflected measurement signal RMS. The radio terminal 300 then evaluates the communication quality regarding the combination of the beam ID (#B1) and the reflection direction ID (#AR1), based on a reception state of the received reflected measurement signal RMS.

The series of processing described above is repeated for all the combinations of the beam ID and the reflection direction ID. That is, the series of processing described above is repeated X×Y×Z times. In the case of the example shown in FIG. 2, there are 32 combination patterns, and thus the series of processing described above is repeated 32 times. Thereby, the communication qualities for all the combinations of the beam ID and the reflection direction ID are obtained.

The radio terminal 300 determines an appropriate combination of the beam ID and the reflection direction ID based on all the communication qualities obtained. That is, the radio terminal 300 determines an appropriate transmission path between the radio base station 100 and the radio terminal 300. For example, the radio terminal 300 selects a transmission path having the highest communication quality as an optimal transmission path. The radio terminal 300 feeds back a feedback signal FB indicating the determined combination of the beam ID and the reflection direction ID to the radio base station 100. Then, based on the feedback signal FB, the radio base station 100 controls communication of a data signal DAT between the radio base station 100 and the radio terminal 300. That is, the radio base station 100 sets the reflection direction in the reflector 200 in accordance with the reflection direction ID, and transmits the data signal DAT by the transmission beam corresponding to the beam ID.

However, it takes a long time to repeat the above-described series of processing for the communication quality evaluation X×Y×Z times. In particular, increases in the number (Y) of the reflectors 200 and the number (Z) of the candidate reflection directions directly lead to an increase in the number of repetitions, which leads to an increase in the time required for the communication quality evaluation. The increase in the time required for the communication quality evaluation leads to an increase in time required for determining the transmission path between the radio base station 100 and the radio terminal 300. The increase in the time required for determining the transmission path leads to a delay in initiation of the communication of the data signal DAT. In a situation where the radio terminal 300 moves, these facts lead to degradation of communication characteristics.

Moreover, as the number of times of the transmission of the measurement signal MS for measuring the communication quality increases, usage of radio resources for the communication quality evaluation increases. This leads to a decrease in frequency usage efficiency.

In addition, in the case of the comparative example, it is necessary to add information on both the beam ID and the reflection direction ID to the measurement signal MS for measuring the communication quality. This leads to an increase in overhead of the measurement signal MS and an increase in overhead of processing for transmitting the measurement signal MS. The increase in the overhead of the measurement signal MS also leads to the increase in usage of radio resources and the decrease in frequency usage efficiency.

Figure 4:
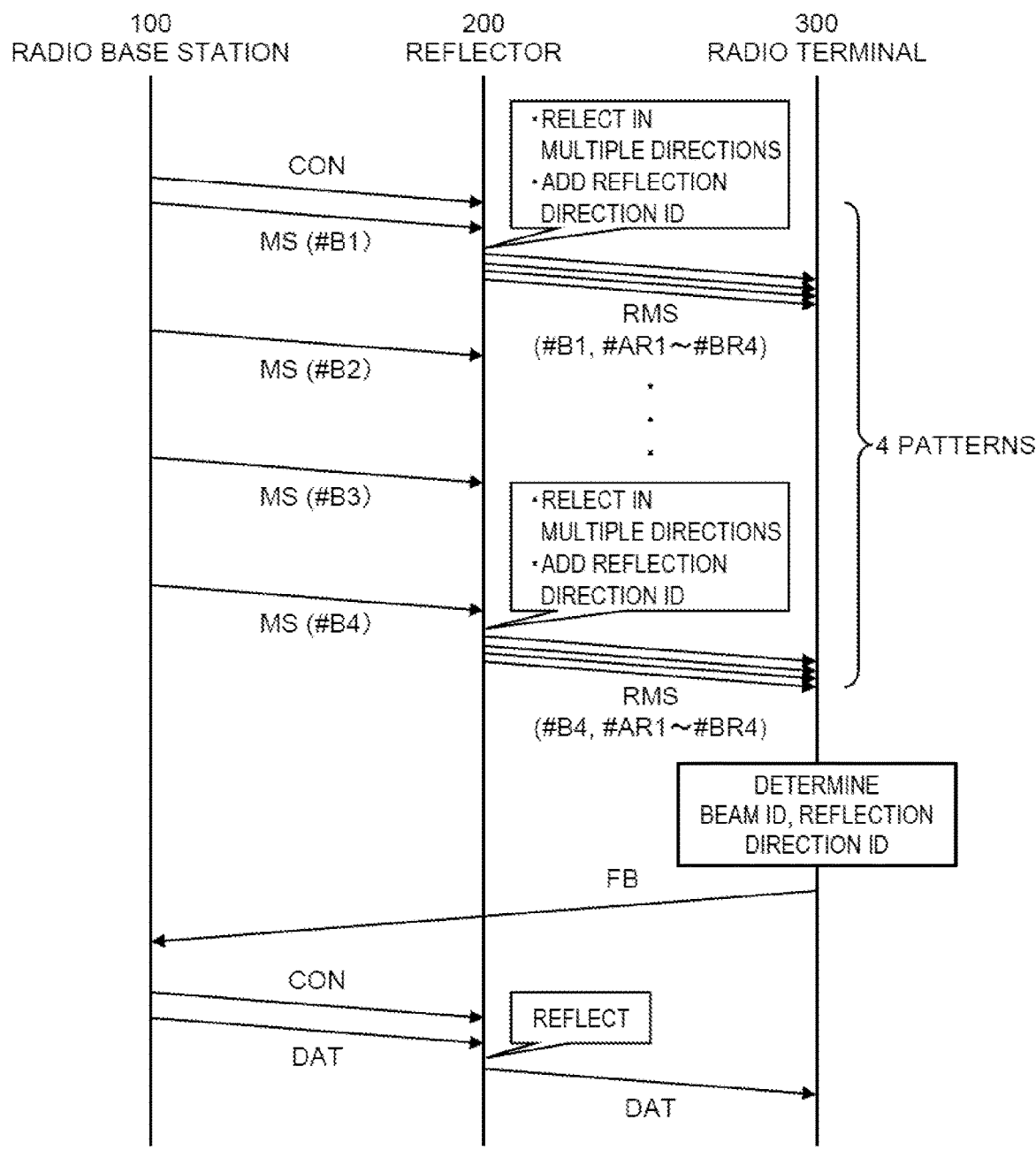
FIG. 4 is a sequence diagram showing processing related to communication quality evaluation according to an embodiment of the present disclosure.

2-3. Processing Related to Communication Quality Evaluation According to Present Embodiment FIG. 4 is a sequence diagram showing processing related to the communication quality evaluation according to the present embodiment.

According to the present embodiment, the reflector 200 reflects the incident measurement signal MS simultaneously in a plurality of reflection directions. For this purpose, the radio base station 100 controls each reflector 200 to reflect the measurement signal MS in the plurality of reflection directions. Specifically, the radio base station 100 transmits the reflection control information CON specifying the plurality of reflection directions (or a plurality of reflection direction IDs) to each reflector 200. A plurality of reflection direction IDs different from each other are assigned to the plurality of reflection directions, respectively. For example, the reflector 200-A sets a plurality of reflection directions corresponding to the plurality of reflection direction IDs (#AR1 to #AR4) in accordance with the reflection control information CON. Similarly, the reflector 200-B sets a plurality of reflection directions corresponding to the plurality of reflection direction IDs (#BR1 to #BR4) in accordance with the reflection control information CON.

Subsequently, the radio base station 100 transmits the measurement signal MS by a transmission beam corresponding to one beam ID (for example, #B1). According to the present embodiment, the measurement signal MS includes information about the beam ID (#B1), but does not include information about the reflection direction ID.

When the measurement signal MS is incident on the reflector 200-A, the reflector 200-A reflects the incident measurement signal MS simultaneously in the plurality of reflection directions that are preset. That is, the reflector 200-A reflects the single measurement signal MS incident on the reflector 200-A in the plurality of reflection directions to generate a plurality of reflected measurement signals RMS. Similarly, when the measurement signal MS is incident on the reflector 200-B, the reflector 200-B reflects the incident measurement signal MS simultaneously in the plurality of reflection directions that are preset. That is, the reflector 200-B reflects the single measurement signal MS incident on the reflector 200-B in the plurality of reflection directions to generate a plurality of reflected measurement signals RMS.

Furthermore, according to the present embodiment, in each reflector 200, information about the reflection direction ID corresponding to the reflection direction is added to each of the plurality of reflected measurement signals RMS. Specifically, each reflector 200 modulates the incident measurement signal MS during the reflection to add the information about the reflection direction ID different for each reflection direction to each of the plurality of reflected measurement signals RMS. For example, the reflector 200-A adds the information about the reflection direction IDs (#AR1 to #AR4) to the plurality of reflected measurement signals RMS, respectively. Furthermore, the reflector 200-B adds the information about the reflection direction IDs (#BR1 to #BR4) to the plurality of reflected measurement signals RMS, respectively.

In order to modulate the measurement signal MS to add the information about the reflection direction ID, a technique of "backscatter communication" disclosed in NPL 3 is utilized, for example. The backscattering modulates an amplitude and a phase of an incident RF signal by switching a load impedance at high speed to add new information. Each reflector 200 is able to modulate the incident measurement signal MS by applying the backscattering to the incident measurement signal MS to add the information about the reflection direction ID.

As described above, the reflector 200 according to the present embodiment reflects the measurement signal MS while adding the information about the reflection direction ID, thereby generating the reflected measurement signal RMS to which the information about the reflection direction ID is added.

When the radio terminal 300 receives the reflected measurement signal RMS from the reflector 200, the radio terminal 300 demodulates the received reflected measurement signal RMS to acquire the reflection direction ID and the beam ID. The radio terminal 300 then evaluates the communication quality for each combination of the beam ID and the reflection direction ID, based on a reception state of the received reflected measurement signal RMS.

The reflection direction ID added by the backscattering can be extracted by the method disclosed in NPL 3. Specifically, a transmission rate is different between the original measurement signal MS and the information about the reflection direction ID added by the backscattering. Based on the difference in the transmission rate, the radio terminal 300 is able to extract the information about the reflection direction ID added by the backscattering. For example, the radio terminal 300 smooths the received reflected measurement signal RMS, calculates a threshold value, and then, compares the smoothed signal with the threshold value to extract the information about the reflection direction ID.

As described above, according to the present embodiment, transmitting a single measurement signal MS corresponding to a single beam ID (candidate transmission direction) makes it possible to collectively evaluate the communication qualities of the plurality of candidate transmission paths related to the single beam ID. Then, repeating the same processing for all the beam IDs (candidate transmission directions) makes it possible to efficiently evaluate the communication qualities of all the candidate transmission paths. In the case of the example shown in FIG. 2, the number (X) of candidate transmission directions is four, and thus it is just necessary to repeat the same processing only four times. That is, the number of repetitions of the processing is reduced to ⅛ of the case of the comparative example described above. Consequently, the time required for evaluating the communication qualities is reduced. Furthermore, since the number of times of the transmission of the measurement signal MS is reduced, the usage of radio resources is reduced and the frequency usage efficiency is improved.

Note that, in the present embodiment, the number of repetitions of the processing depends only on the number (X) of the candidate transmission directions, and does not depend on the number (Y) of the reflectors 200 and the number (Z) of the candidate reflection directions. Even when the number (Y) of the reflectors 200 increases, the number of repetitions of the processing does not change. Even when the number (Z) of the candidate reflection directions increases, the number of repetitions of the processing does not change. This is preferable from a viewpoint of expanding the applications of the reflector 200.

Furthermore, according to the present embodiment, the setting of the reflection direction in the reflector 200 for the communication quality evaluation needs to be done only once at the beginning. The reason is that there is no need to switch the reflection direction after the plurality of reflection directions are initially set in each reflector 200. As can be clearly seen from a comparison between FIG. 3 and FIG. 4, the number of times of the setting of the reflection direction using the reflection control information CON is significantly reduced. This contributes not only to reduction in the time required for evaluating the communication quality, but also to reduction in processing load applied on the radio base station 100.

As described above, according to the present embodiment, the time required for evaluating the quality of communication between the radio base station 100 and the radio terminal 300 via the reflector 200 is reduced. Since the time required for evaluating the communication quality is reduced, the time required for determining the transmission path between the radio base station 100 and the radio terminal 300 is reduced. Since the time required for determining the transmission path is reduced, it is possible to start the communication of the data signal DAT early. This is preferable from a viewpoint of the communication characteristics in the situation where the radio terminal 300 moves.

Furthermore, according to the present embodiment, it is only required to add the beam ID to the measurement signal MS for measuring the communication quality, and it is not necessary to add the reflection direction ID. The reason is that the information about the reflection direction ID is added to the reflected measurement signal RMS in the reflector 200. Since the measurement signal MS does not include the information about the reflection direction ID, the overhead of the measurement signal MS and the overhead of the processing of transmitting the measurement signal MS are reduced. Furthermore, since the overhead of the measurement signal MS is reduced, the usage of the radio resources is reduced and the frequency usage efficiency is improved.

2-4. Modification Examples

2-4-1. First Modification Example

The plurality of reflection directions used for the communication quality evaluation may be fixed. In this case, it is not necessary to transmit the reflection control information CON for the communication quality evaluation shown in FIG. 4. The reflector 200 assigns a plurality of reflection direction IDs to the plurality of reflection directions in advance. The others are the same as in the case of the embodiment described above. Since there is no need to transmit the reflection control information CON for the communication quality evaluation, the processing time and the processing load are further reduced.

2-4-2. Second Modification Example

It is also possible that the reflection direction ID includes only the identification information for identifying the reflection direction and does not include the identification information for identifying the reflector 200. In this case, the measurement signal MS transmitted from the radio base station 100 includes the identification information for identifying the beam ID and the reflector 200. The radio base station 100 transmits the measurement signal MS for each combination of the beam ID and the reflector 200. In this case, the number of repetitions of the processing is X×Y. Even in this case, at least the effects can be obtained as compared with the comparative example described above.

2-5. Processing Flow

Figure 5:
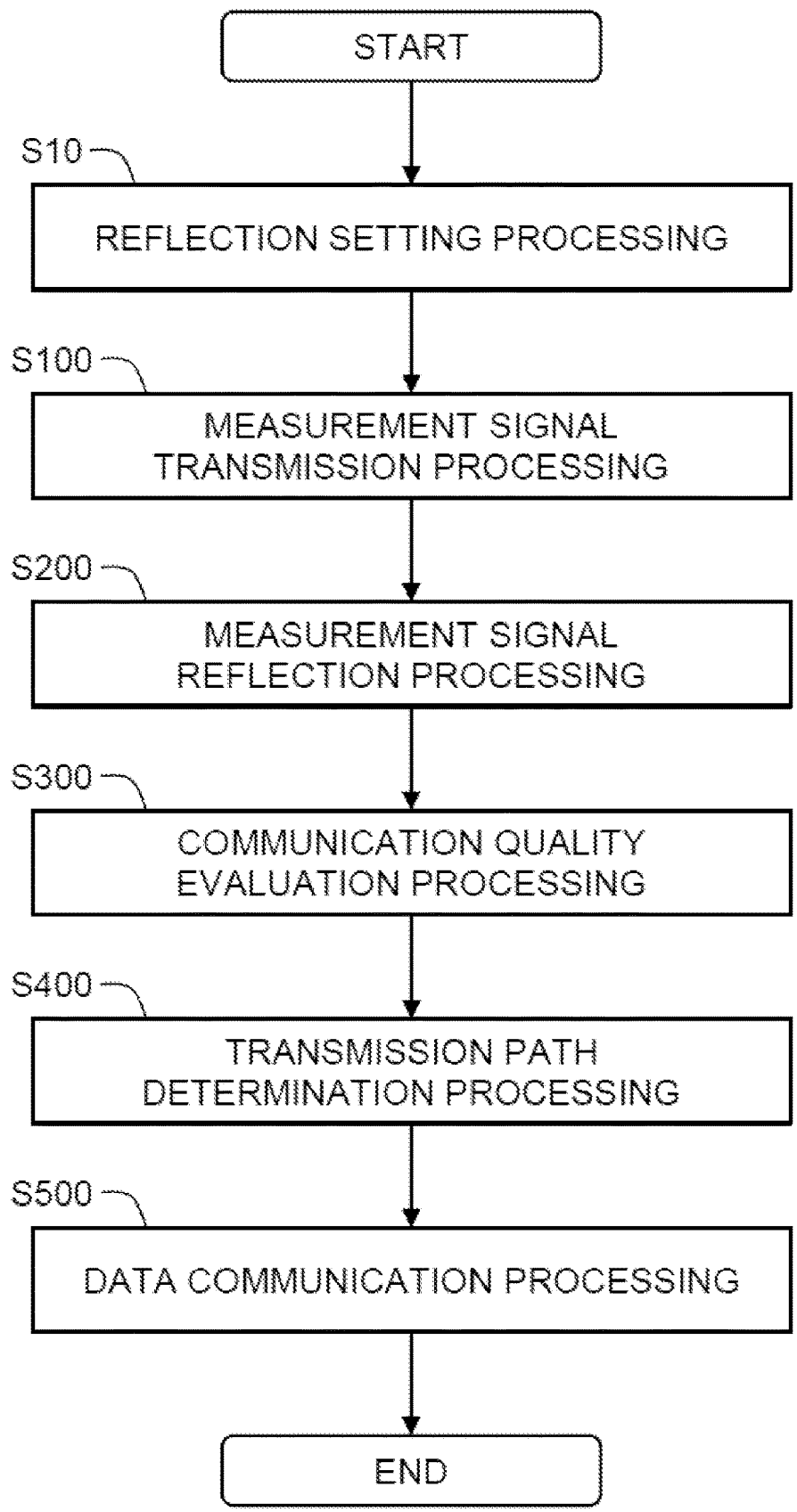
FIG. 5 is a flowchart summarizing the processing related to the communication quality evaluation according to an embodiment of the present disclosure.

FIG. 5 is a flowchart summarizing the processing related to the communication quality evaluation according to the present embodiment.

In Step S10, the radio base station 100 and the reflector 200 perform "reflection setting processing." Specifically, the radio base station 100 transmits the reflection control information CON specifying the plurality of reflection directions to the reflector 200. The reflector 200 sets the plurality of reflection directions in accordance with the reflection control information CON. The plurality of reflection direction IDs different from each other are assigned to the plurality of reflection directions, respectively. Note that, in the case of the first modification example described above, Step S10 is omitted.

In Step S100, the radio base station 100 performs "measurement signal transmission processing." Specifically, the radio base station 100 forms a transmission beam and transmits the measurement signal MS by the transmission beam. The measurement signal MS includes the information about the beam ID, but does not include the information about the reflection direction ID.

In Step S200, the reflector 200 performs "measurement signal reflection processing." Specifically, the reflector 200 reflects the single measurement signal MS incident on the reflector 200 simultaneously in the plurality of reflection directions to generate the plurality of reflected measurement signals RMS. During the reflection, the reflector 200 modulates the single incident measurement signal MS to add the information about the reflection direction ID being different for each of the plurality of reflection directions to each of the plurality of reflected measurement signals RMS. For example, the reflector 200 modulates the single incident measurement signal MS by applying the backscattering to the single incident measurement signal MS.

In Step S300, the radio terminal 300 performs "communication quality evaluation processing." Specifically, the radio terminal 300 demodulates the reflected measurement signal RMS received from the reflector 200 to acquire the reflection direction ID and the beam ID. The radio terminal 300 then evaluates the communication quality for each combination of the beam ID and the reflection direction ID, based on the reception state of the received reflected measurement signal RMS.

Steps S100 to S300 are repeatedly performed for each beam ID (candidate transmission direction). It is not necessary to repeat Step S10 (reflection setting processing). After the communication quality evaluation processing is completed for all the beam IDs (candidate transmission directions), the processing proceeds to Step S400.

In Step S400, the radio terminal 300 performs "transmission path determination processing." Specifically, the radio terminal 300 determines an appropriate combination of the beam ID and the reflection direction ID, based on all the communication qualities obtained. That is, the radio terminal 300 determines an appropriate transmission path between the radio base station 100 and the radio terminal 300. The radio terminal 300 feeds back the feedback signal FB indicating the determined combination of the beam ID and the reflection direction ID to the radio base station 100 (see FIG. 4).

As a modification example, the transmission path determination processing may be performed by the radio base station 100 instead of the radio terminal 300. In this case, the feedback signal FB fed back from the radio terminal 300 to the radio base station 100 indicates the communication quality for each combination of the beam ID and the reflection direction ID. The radio base station 100 determines, based on the feedback signal FB, an appropriate combination of the beam ID and the reflection direction ID, that is, an appropriate transmission path.

In Step S500, the radio base station 100 performs "data communication processing." Specifically, the radio base station 100 controls the communication of the data signal DAT between the radio base station 100 and the radio terminal 300, based on the transmission path determined in Step S400. More specifically, the radio base station 100 transmits the reflection control information CON to the reflector 200 identified by the reflection direction ID. The reflection control information CON includes the reflection direction identified by the reflection direction ID. The reflector 200 sets the reflection direction corresponding to the reflection direction ID in accordance with the reflection control information CON. The radio base station 100 then transmits the data signal DAT by the transmission beam corresponding to the beam ID.

The processing described above provides the above-mentioned excellent effect according to the present embodiment.

3. Configuration Example of Radio Communication System

An example of a configuration of the radio communication system 10 according to the present embodiment will be described below.

3-1. Radio Base Station 100

Figure 6:
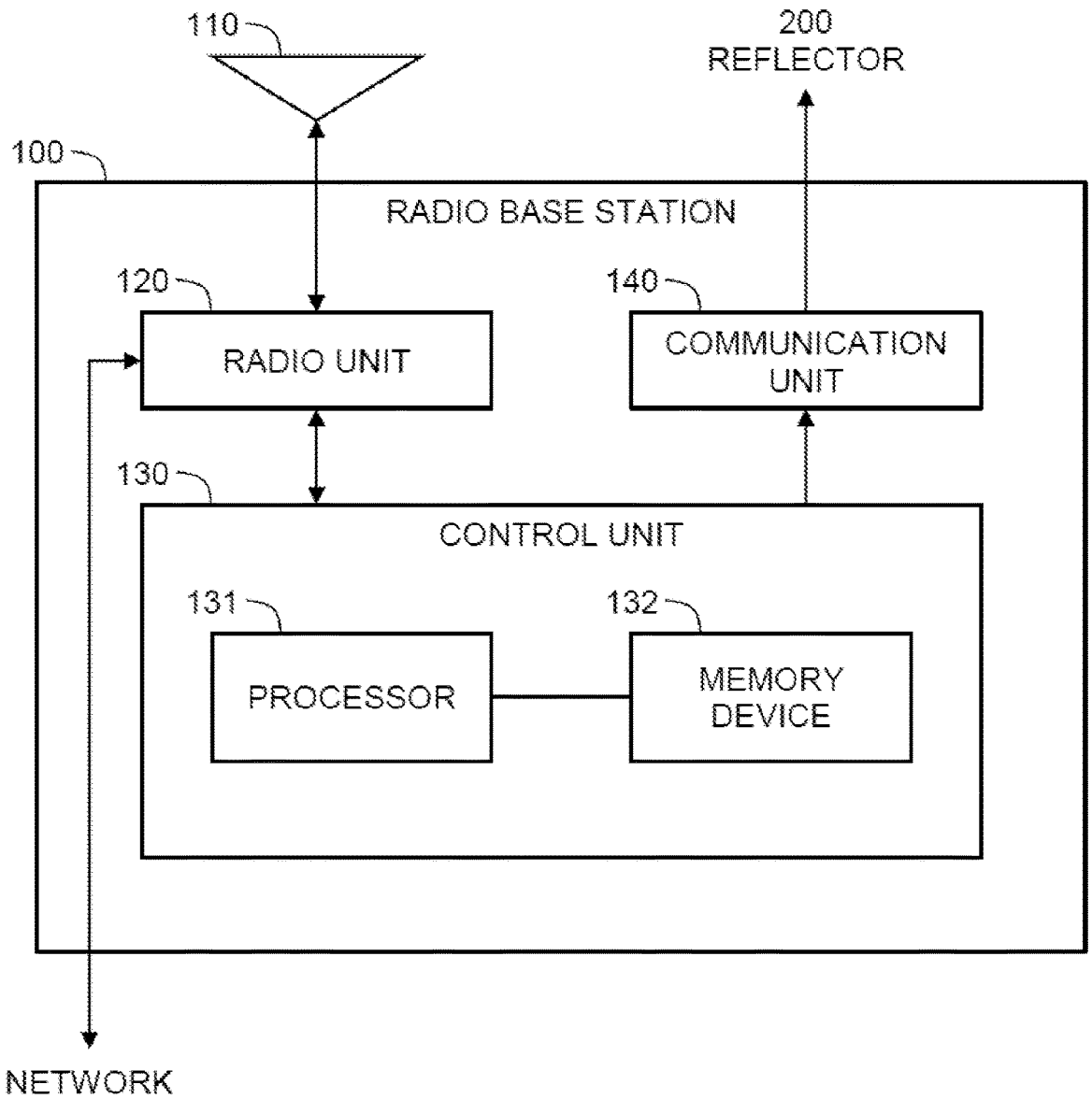
FIG. 6 is a block diagram showing an example of a configuration of a radio base station according to an embodiment of the present disclosure.

FIG. 6 is a block diagram showing an example of a configuration of the radio base station 100 according to the present embodiment. The radio base station 100 includes an antenna unit 110, a radio unit 120, a control unit 130, and a communication unit 140.

The antenna unit 110 transmits and receives radio waves. The antenna unit 110 outputs a received signal to the radio unit 120, and transmits a signal input from the radio unit 120. Any type of antenna may be used. For example, the antenna unit 110 may include a plurality of antenna elements and a variable phase shifter and perform analog beam forming.

The radio unit 120 includes a transmitter and a receiver, and performs transmission and reception processing in accordance with a communication scheme between the radio base station 100 and the radio terminal 300. For example, the radio unit 120 forms a transmission beam corresponding to the beam ID, and transmits the measurement signal MS and the data signal DAT input from the control unit 130. Furthermore, in the transmission path determination processing (Step S400), the radio unit 120 receives the feedback signal FB transmitted from the radio terminal 300, and acquires the beam ID and the reflection direction ID included in the feedback signal FB. The radio unit 120 transmits the information about the acquired beam ID and reflection direction ID to the control unit 130. In addition, the radio unit 120 also communicates with an upper-level network of the radio base station 100.

The control unit 130 performs various types of information processing. For example, the control unit 130 manages the radio terminal 300, the beam ID, and the reflection direction ID in association with each other.

In the measurement signal transmission processing (Step S100), the control unit 130 generates the measurement signal MS and outputs the measurement signal MS to the radio unit 120. The measurement signal MS includes the information about the beam ID, previously known information about the radio terminal 300, and the like. The measurement signal MS may include a preamble portion for channel estimation in order to improve demodulation accuracy. In the data communication processing (Step S500), the control unit 130 generates the data signal DAT and outputs the data signal DAT to the radio unit 120.

Furthermore, the control unit 130 manages and controls the reflector 200 and the reflection characteristic. In the reflection setting processing (Step S10) and the data communication processing (Step S500), the control unit 130 generates the reflection control information CON for controlling the reflection characteristic, and outputs the reflection control information CON to the communication unit 140. The reflection control information CON specifies a number N of reflection directions and the reflection directions (or the reflection direction IDs) in the reflector 200. The number N of reflection directions is equal to or greater than 1. In the reflection setting processing (Step S10) during the communication quality evaluation, the number N of reflection directions to be specified is equal to or greater than 2. The two or more reflection directions may be any directions. Preferably, the two or more reflection directions include a reflection direction corresponding to a reflection direction ID currently associated with the radio terminal 300. In the data communication processing (Step S500), assuming that the radio terminal 300 moves, the number N of reflection directions may be equal to or greater than 2.

The function of the control unit 130 is implemented by a controller that performs various types of information processing. The controller includes a processor 131 and a memory device 132. Various types of information and a control program are stored in the memory device 132. Examples of the memory device 132 include a volatile memory and a non-volatile memory. The function of the control unit 130 is implemented by the processor 131 executing the control program stored in the memory device 132. The control program may be recorded on a non-transitory computer-readable recording medium. The controller may be implemented by using a hardware such as an application specific integrated circuit (ASIC), a programmable logic device (PLD), or a field programmable gate array (FPGA).

The communication unit 140 transmits, to the reflector 200, the reflection control information CON input from the control unit 130. Any communication scheme can be used. For example, the communication scheme is a wired communication such as optical communication. In another example, the communication scheme may be the same as the radio communication scheme between the radio base station 100 and the radio terminal 300 (frequency bands may be the same or different). In this case, the communication unit 140 and the radio unit 120 may be common.

3-2. Reflector 200

Figure 7:
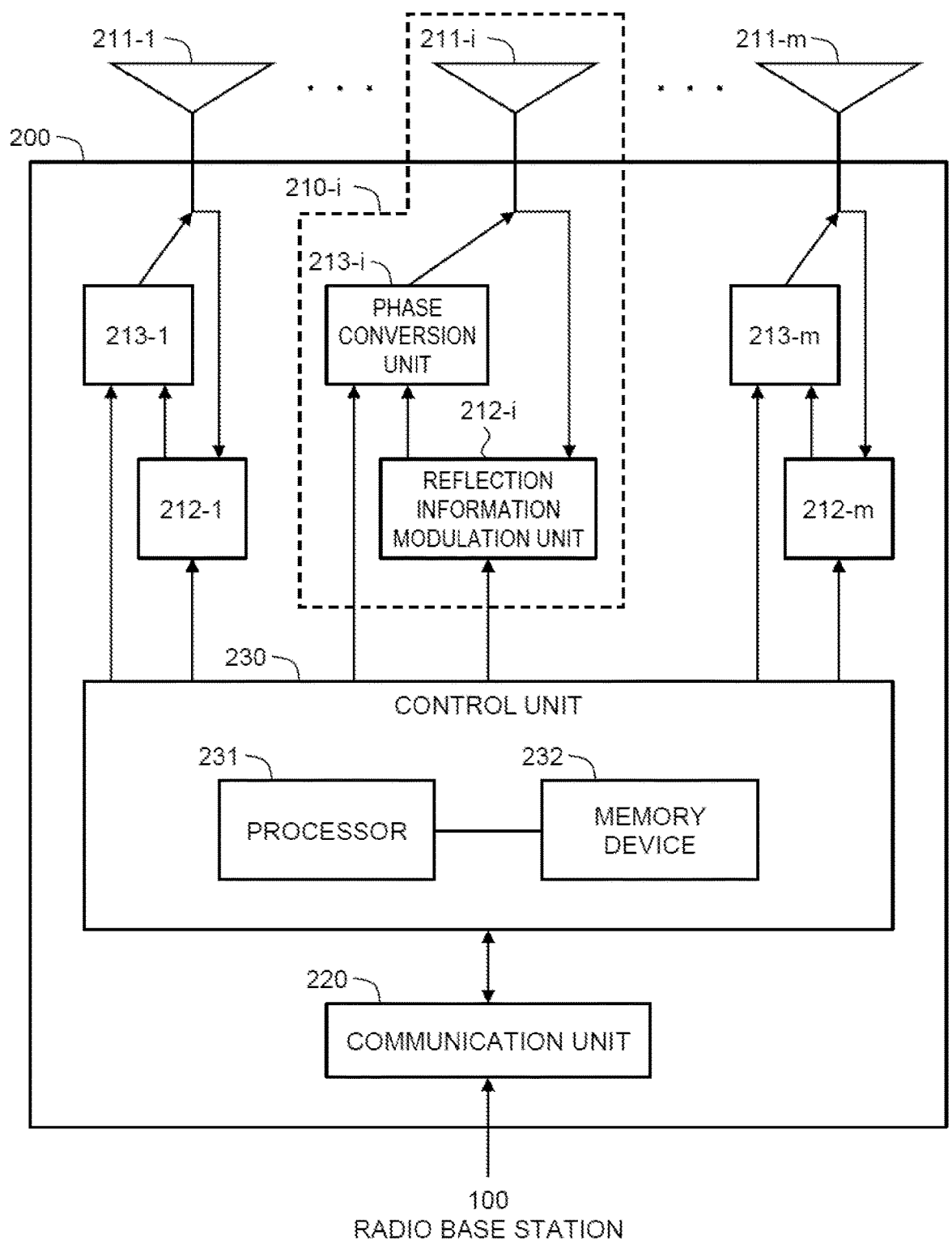
FIG. 7 is a block diagram showing an example of a configuration of a reflector according to an embodiment of the present disclosure.

FIG. 7 is a block diagram showing an example of a configuration of the reflector 200 according to the present embodiment. The reflector 200 includes a plurality of reflection units 210-1 to 210-*m* (m is an integer equal to or greater than 2), a communication unit 220, and a control unit 230.

Each reflection unit 210-*i* (i=1 to m) reflects radio waves transmitted from the radio base station 100 or the radio terminal 300. More specifically, each reflection unit 210-*i* includes a reflection element 211-*i*, a reflection information modulation unit 212-*i*, and a phase conversion unit 213-*i*. A signal incident on the reflection element 211-*i* is reflected via the reflection information modulation unit 212-*i* and the phase conversion unit 213-*i*.

In the measurement signal reflection processing (Step 200), the reflection information modulation unit 212-*i* modulates the measurement signal MS incident on the reflection element 211-*i* to add the information about the specified reflection direction ID to the measurement signal MS. The information about the reflection direction ID is notified from the control unit 230. Any modulation scheme can be used. For example, the modulation scheme can be selected from amplitude shift keying (ASK), frequency shift keying (FSK), phase shift keying (PSK), and quadrature amplitude modulation (QAM). For example, the reflection information modulation unit 212-*i* modulates the measurement signal MS by applying the backscattering that switches the load impedance at high speed to the measurement signal MS, to add the information about the reflection direction ID. Note that, it is not always necessary to operate the reflection information modulation unit 212-*i* with respect to signals other than the measurement signal MS.

The phase conversion unit 213-*i* includes a variable phase shifter. The phase conversion unit 213-*i* converts the phase of the reflection signal so that the specified reflection direction is achieved. Information about a phase amount is notified from the control unit 230. The phase conversion unit 213-*i* multiplies the reflection signal by the acquired phase amount, and then outputs the reflection signal to the reflection element 211-*i*.

The communication unit 220 receives the reflection control information CON transmitted from the radio base station 100. The communication scheme is the same as the communication scheme of the communication unit 140 in the radio base station 100. The communication unit 220 transmits the received reflection control information CON to the control unit 230.

The control unit 230 performs various types of information processing. For example, in the reflection setting processing (Step S10) and the data communication processing (Step S500), the control unit 230 generates reflection group information GRP from the reflection control information CON. As described above, the reflection control information CON includes the number N of the reflection directions and the reflection direction (or the reflection direction ID). The control unit 230 divides the plurality of reflection units 210-1 to 210-*m* into N groups. The control unit 230 then assigns different reflection directions and different reflection direction IDs to the N groups, respectively. FIG. 8 shows an example of the reflection group information GRP. The reflection group information GRP indicates, reflection unit numbers for identifying the reflection units 210, the reflection direction, and the reflection direction ID for each group. Each time the reflection control information CON is notified, the reflection group information GRP is updated.

The control unit 230 refers to the reflection group information GRP to recognize the reflection direction ID assigned to each group and the reflection units 210 constituting each group. Then, the control unit 230 notifies the reflection information modulation unit 212 of the reflection unit 210 of the information about the assigned reflection direction ID, for each group.

Furthermore, the control unit 230 refers to the reflection group information GRP to recognize the reflection direction assigned to each group and the reflection units 210 constituting each group. The control unit 230 calculates the phase amount to be multiplied in the phase conversion unit 213 of each reflection unit 210 of each group so that the assigned reflection direction is achieved. In the calculation of the phase amount, an arrangement of the reflection elements 211 in each group is also considered. Then, the control unit 230 notifies the phase conversion unit 213 of the reflection unit 210 of information about the calculated phase amount, for each group.

The function of the control unit 230 is implemented by a controller that performs various types of information processing. The controller includes a processor 231 and a memory device 232. Various types of information and a control program are stored in the memory device 232. Examples of the memory device 232 include a volatile memory and a non-volatile memory. The function of the control unit 230 is implemented by the processor 231 executing the control program stored in the memory device 232. The control program may be recorded on a non-transitory computer-readable recording medium. The controller may be implemented by using hardware such as an ASIC, a PLD, and an FPGA.

3-3. Radio Terminal 300

Figure 9:
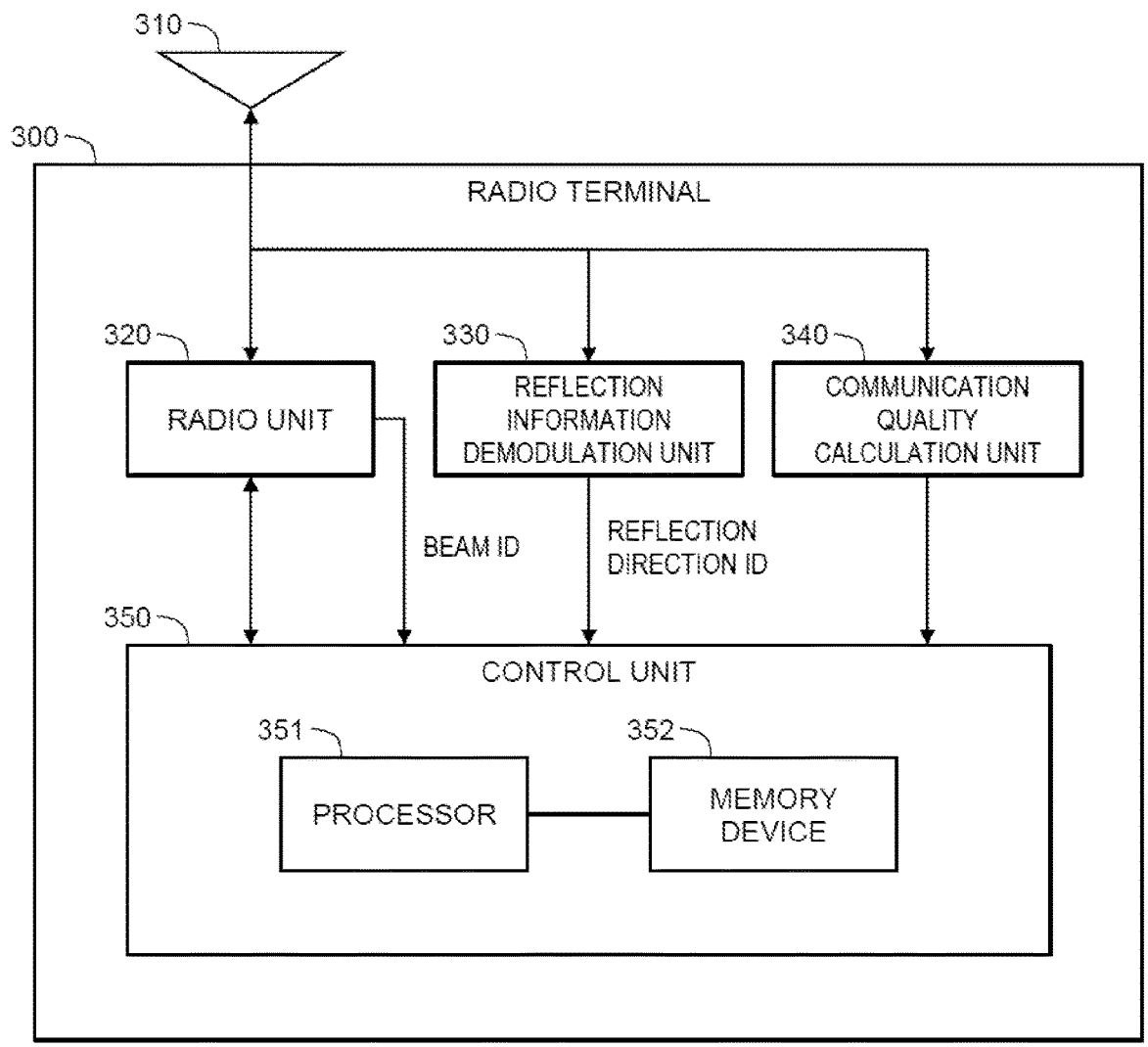
FIG. 9 is a block diagram showing an example of a configuration of a radio terminal according to an embodiment of the present disclosure.

FIG. 9 is a block diagram showing an example of a configuration of the radio terminal 300 according to the present embodiment. The radio terminal 300 includes an antenna unit 310, a radio unit 320, a reflection information demodulation unit 330, a communication quality calculation unit 340, and a control unit 350.

The antenna unit 310 transmits and receives radio waves. The antenna unit 310 outputs a received signal to the radio unit 320, and transmits a signal input from the radio unit 320. Any type of antenna may be used. For example, the antenna unit 310 may include a plurality of antenna elements and a variable phase shifter and perform analog beam forming.

The radio unit 320 includes a transmitter and a receiver, and performs transmission and reception processing in accordance with a communication scheme between the radio base station 100 and the radio terminal 300. For example, in the data communication processing (Step S500), the radio unit 320 receives the data signal DAT transmitted from the radio base station 100 and outputs the data signal DAT to the control unit 350. Furthermore, in the transmission path determination processing (Step S400), the radio unit 320 performs transmission processing of transmitting the feedback signal FB output from the control unit 350. Moreover, in the communication quality evaluation processing (Step S300), the radio unit 320 receives the reflected measurement signal RMS, demodulates the received reflected measurement signal RMS to acquire the beam ID, and outputs information about the beam ID to the control unit 350.

In the communication quality evaluation processing (Step S300), the reflection information demodulation unit 330 receives the reflected measurement signal RMS via the antenna unit 310. The reflection information demodulation unit 330 demodulates the received reflected measurement signal RMS to acquire the reflection direction ID added in the reflector 200. A demodulation scheme corresponds to the modulation scheme in the reflection information modulation unit 212 of the reflector 200. The reflection direction ID added by the backscattering can be acquired by the method disclosed in NPL 3. For example, the reflection information demodulation unit 330 smooths the received reflected measurement signal RMS, calculates a threshold value, and then compares the smoothed signal with the threshold value to acquire the information about the reflection direction ID. The reflection information demodulation unit 330 can be achieved by a simple analog circuit using a capacitor or a comparator.

In the communication quality evaluation processing (Step S300), the communication quality calculation unit 340 receives the reflected measurement signal RMS via the antenna unit 310. The communication quality calculation unit 340 calculates the communication quality based on the received reflected measurement signal RMS. For example, the communication quality is represented by a parameter such as a received signal strength indicator (RSSI), reference signal received power (RSRP), a signal to interference plus noise ratio (SINR), and an error rate. Furthermore, the communication quality calculation unit 340 may rank the communication quality. For example, when the RSRP is equal to or greater than a first threshold value and the error rate is lower than a second threshold value, the communication quality is rank 1 (high quality). When the RSRP is equal to or greater than the first threshold value and the error rate is equal to or greater than the second threshold value, the communication quality is rank 2 (medium quality). When the RSRP is lower than the first threshold value and the error rate is lower than the second threshold value, the communication quality is rank 3 (medium quality). When the RSRP is lower than the first threshold value and the error rate is equal to or greater than the second threshold value, the communication quality is rank 4 (low quality). The communication quality calculation unit 340 outputs information about the acquired communication quality to the control unit 350.

The control unit 350 performs various types of information processing. For example, in the communication quality evaluation processing (Step S300), the control unit 350 receives the information about the beam ID, the reflection direction ID, and the communication quality to generate communication quality information QLC. FIG. 10 shows an example of the communication quality information QLC. The communication quality information QLC indicates the communication quality for each combination of the beam ID and the reflection direction ID.

Furthermore, in the transmission path determination processing (Step S400), the control unit 350 determines an appropriate combination of the beam ID and the reflection direction ID based on the communication quality information QLC. That is, the control unit 350 determines an appropriate transmission path between the radio base station 100 and the radio terminal 300. For example, the control unit 350 determines a combination of the beam ID and the reflection direction ID having the highest communication quality within a constant time period. The control unit 350 then outputs the feedback signal FB indicating the determined combination of the beam ID and the reflection direction ID to the radio unit 320.

As another example, the control unit 350 may extract, as candidates to be used, all combinations having the communication quality equal to or greater than a predetermined threshold value. In this case, the control unit 350 determines whether a previous combination is included in the candidates to be used. When the previous combination is included in the candidates to be used, the control unit 350 preferentially selects the previous combination. In this example, frequent switching of the transmission beam and the reflection direction is suppressed. As a result, more stable communication can be provided.

As still another example, a case is considered where the communication qualities of a plurality of combinations are equally high. The plurality of communication qualities being equally high means that the plurality of communication qualities are within a predetermined range. The control unit 350 determines whether the previous combination is included in the plurality of combinations. When the previous combination is included in the plurality of combinations, the control unit 350 preferentially selects the previous combination. Also in this example, frequent switching of the transmission beam and the reflection direction is suppressed. As a result, more stable communication can be provided.

The function of the control unit 350 is implemented by a controller that performs various types of information processing. The controller includes a processor 351 and a memory device 352. Various types of information and a control program are stored in the memory device 352. Examples of the memory device 352 include a volatile memory and a non-volatile memory. The function of the control unit 350 is implemented by the processor 351 executing the control program stored in the memory device 352. The control program may be recorded on a non-transitory computer-readable recording medium. The controller may be implemented by using hardware such as an ASIC, a PLD, and an FPGA.

REFERENCE SIGNS LIST

10 . . . Radio communication system
100 . . . Radio base station
200 . . . Reflector
300 . . . Radio terminal
CON . . . Reflection control information
DAT . . . Data signal
FB . . . Feedback signal
GRP . . . Reflection group information
MS . . . Measurement signal
RMS . . . Reflected measurement signal

The invention claimed is:

1. A radio communication method of performing communication between
a radio base station and a radio terminal via a reflector,
wherein the radio base station is configured to form a transmission beam and transmit a signal by the transmission beam,
the reflector is configured to reflect the signal transmitted from the radio base station, the radio terminal is configured to receive the signal reflected by the reflector, and the radio communication method comprises:
measurement signal transmission processing that transmits a measurement signal including a beam ID of the transmission beam from the radio base station, the measurement signal being for measuring a quality of communication between the radio base station and the radio terminal;
measurement signal reflection processing that reflects the measurement signal incident on the reflector in a plurality of reflection directions to generate a plurality of reflected measurement signals, and modulates the incident measurement signal during reflection to add information about a reflection direction ID to each of the plurality of reflected measurement signals, the reflection direction ID being different for each of the plurality of reflection directions; and
communication quality evaluation processing that, by the radio terminal, demodulates a reflected measurement signal received from the reflector to acquire the reflection direction ID and the beam ID, and evaluates the quality of communication for each combination of the beam ID and the reflection direction ID based on a reception state of the received reflected measurement signal;
wherein the measurement signal includes the beam ID and does not include the reflection direction ID.

2. The radio communication method according to claim 1, wherein
the measurement signal reflection processing modulates the incident measurement signal by applying backscattering to the incident measurement signal.

3. The radio communication method according to claim 1, wherein
a number of the reflector is one or more, and
the reflection direction ID includes information identifying each reflector and information identifying each reflection direction.

4. The radio communication method according to any claim 1, wherein
a number of candidate transmission direction of the transmission beam is one or more,
the beam ID is different for each candidate transmission direction, and
the radio communication method further comprises:
performing the measurement signal transmission processing, the measurement signal reflection processing, and the communication quality evaluation processing for each candidate transmission direction;
after the communication quality evaluation processing is completed for all of the one or more candidate transmission directions, determine a transmission path between the radio base station and the radio terminal by determining a combination of the beam ID and the reflection direction ID based on the quality of communication; and
controlling the communication between the radio base station and the radio terminal based on the determined transmission path.

5. A radio communication system comprising:
a radio base station comprising a memory and a processor; the processor is configured to form a transmission beam and transmit a signal by the transmission beam;
a reflector comprising a memory and a processor; the processor is configured to reflect the signal transmitted from the radio base station; and
a radio terminal comprising a memory and a processor; the processor is configured to receive the signal reflected by the reflector,
wherein the radio base station is configured to perform measurement signal transmission processing that transmits a measurement signal including a beam ID of the transmission beam, the measurement signal being for measuring a quality of communication between the radio base station and the radio terminal,
the reflector is configured to perform measurement signal reflection processing that reflects the measurement signal incident on the reflector in a plurality of reflection directions to generate a plurality of reflected measurement signals, and modulates the incident measurement signal during reflection to add information about a reflection direction ID to each of the plurality of reflected measurement signals, the reflection direction ID being different for each of the plurality of reflection directions, and the radio terminal is configured to perform communication quality evaluation processing that demodulates a reflected measurement signal received from the reflector to acquire the reflection direction ID and the beam ID, and evaluates the quality of communication for each combination of the beam ID and the reflection direction ID based on a reception state of the received reflected measurement signal;

wherein the measurement signal includes the beam ID and does not include the reflection direction ID.

6. A reflector comprising a memory and a processor; wherein the processor is configured to reflect a signal transmitted from a radio base station, wherein the radio base station comprising a memory and a processor; the radio base station is configured to form a transmission beam and transmit the signal by the transmission beam, the radio terminal comprising a memory and a processor; the radio terminal is configured to receive the signal reflected by the reflector, the radio base station is configured to perform measurement signal transmission processing that transmits a measurement signal including a beam ID of the transmission beam, the measurement signal being for measuring a quality of communication between the radio base station and the radio terminal, the reflector is configured to perform measurement signal reflection processing that reflects the measurement signal incident on the reflector in a plurality of reflection directions to generate a plurality of reflected measurement signals, and modulates the incident measurement signal during reflection to add information about a reflection direction ID to each of the plurality of reflected measurement signals, the reflection direction ID being different for each of the plurality of reflection directions, and the radio terminal is configured to perform communication quality evaluation processing that demodulates a reflected measurement signal received from the reflector to acquire the reflection direction ID and the beam ID, and evaluates the quality of communication for each combination of the beam ID and the reflection direction ID based on a reception state of the received reflected measurement signal;

wherein the measurement signal includes the beam ID and does not include the reflection direction ID.

* * * * *